(12) United States Patent
Watanabe et al.

(10) Patent No.: US 10,148,853 B2
(45) Date of Patent: Dec. 4, 2018

(54) IMAGE PROCESSING DEVICE FOR CORRECTING SKEW DEVIATION, IMAGE FORMING APPARATUS, IMAGE PROCESSING METHOD FOR CORRECTING SKEW DEVIATION, AND NON-TRANSITORY RECORDING MEDIUM

(71) Applicants: Yuuto Watanabe, Kanagawa (JP); Tomonori Tanaka, Kanagawa (JP); Naoki Ohta, Kanagawa (JP); Mitsutaka Iwasaki, Kanagawa (JP)

(72) Inventors: Yuuto Watanabe, Kanagawa (JP); Tomonori Tanaka, Kanagawa (JP); Naoki Ohta, Kanagawa (JP); Mitsutaka Iwasaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 42 days.

(21) Appl. No.: 15/378,401

(22) Filed: Dec. 14, 2016

(65) Prior Publication Data
US 2017/0195518 A1    Jul. 6, 2017

(30) Foreign Application Priority Data

Jan. 5, 2016   (JP) ................................. 2016-000510

(51) Int. Cl.
*H04N 1/38*     (2006.01)
*H04N 1/387*    (2006.01)
(Continued)

(52) U.S. Cl.
CPC ....... *H04N 1/3878* (2013.01); *H04N 1/00068* (2013.01); *H04N 1/2104* (2013.01); *H04N 1/506* (2013.01); *H04N 2201/0094* (2013.01)

(58) Field of Classification Search
None
See application file for complete search history.

(56) References Cited

U.S. PATENT DOCUMENTS 6,122,412 A *  9/2000  Noguchi ............... H04N 1/047
                                                       382/312
8,405,880 B1 *  3/2013  Keithley ............... H04N 1/047
                                                       347/132
(Continued)

FOREIGN PATENT DOCUMENTS

JP        2007-226330         9/2007

*Primary Examiner* — Barbara D Reinier
(74) *Attorney, Agent, or Firm* — Harness, Dickey & Pierce, P.L.C.

(57) ABSTRACT

An image processing device includes a writing circuit to write image data to a first memory, a second memory with a capacity of lines, a coordinate generating circuit to generate coordinate information based on inclination information, a deviation calculating circuit to calculate a maximum deviation amount of the image data from the coordinate information, a division number calculating circuit to calculate a division number based on the number of the lines and the deviation amount, an address generating circuit to generate an address for reading each of divided areas of the image data from the first memory, a burst length calculating circuit to calculate a burst length based on the division number and a main scanning width of the image data, and a transferring circuit to read and burst-transfer the image data from the first memory to the second memory based on the address and the burst length.

10 Claims, 12 Drawing Sheets

(51) Int. Cl.
*H04N 1/00* (2006.01)
*H04N 1/21* (2006.01)
*H04N 1/50* (2006.01)

(56) References Cited

U.S. PATENT DOCUMENTS

| | | | |
|---|---|---|---|
| 2009/0148055 A1* | 6/2009 | Kurigata | G06K 9/3275 382/235 |
| 2010/0045766 A1* | 2/2010 | Imai | G02B 26/123 347/232 |
| 2010/0253981 A1* | 10/2010 | Higashiyama | H04N 1/3878 358/3.26 |
| 2011/0135362 A1* | 6/2011 | Cho | G03G 15/607 399/372 |
| 2017/0187916 A1* | 6/2017 | Ohta | H04N 1/3878 |
| 2017/0187917 A1* | 6/2017 | Tanaka | H04N 1/3878 |

* cited by examiner

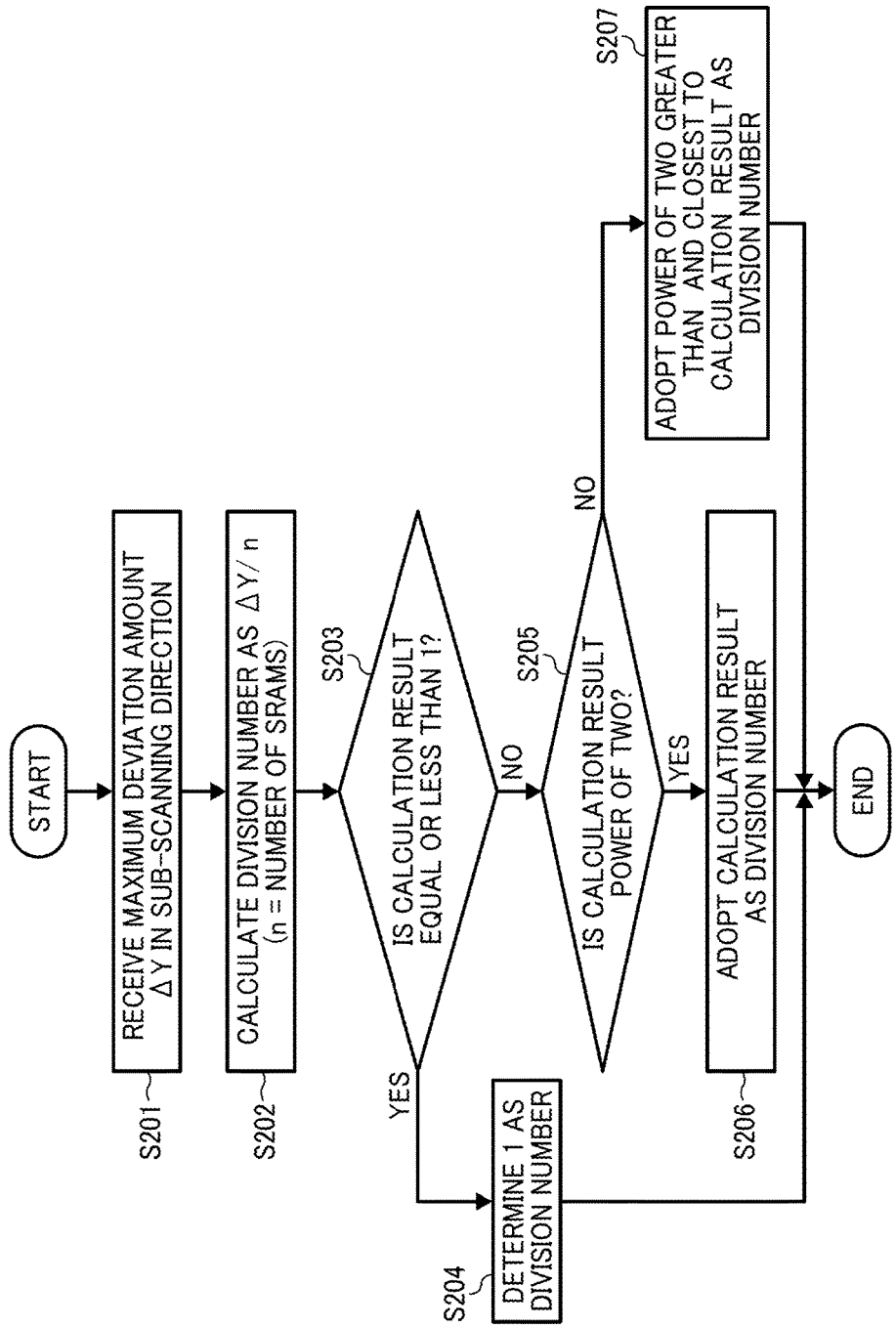

IMAGE PROCESSING DEVICE FOR CORRECTING SKEW DEVIATION, IMAGE FORMING APPARATUS, IMAGE PROCESSING METHOD FOR CORRECTING SKEW DEVIATION, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2016-000510 filed on Jan. 5, 2016, in the Japan Patent Office, the entire disclosure of which is hereby incorporated by reference herein.

BACKGROUND

Technical Field

The present invention relates to an image processing device, an image forming apparatus, an image processing method, and a non-transitory recording medium.

Description of the Related Art

A typical image forming apparatus stores one page of image data in an image memory, transfers the image data to an image processing unit to perform a variety of image processing on the image data, and writes the processed image data back to the image memory or transfers and outputs the processed image data to an external destination.

The image forming apparatus may have a skew or distortion in the image data. To correct the image data to cancel such distortion and an inclination of a scanning line of the image data, the image forming apparatus uses line buffers to perform an interpolation process using pixels around a bend portion of the scanning line. The capacity of the line buffers used in the interpolation process replies on the width of the bend of the scanning line.

In the transfer of the image data between the image memory and the image processing unit to perform the image processing on the image data, if the image data is transferred from the image memory to the image processing unit in line units without being divided into segments, the data transfer efficiency is increased. In the transfer of the image data for the image processing in the image processing unit, the image data may also be transferred as divided into segments in accordance with the image processing to be performed in the image processing unit.

SUMMARY

In one embodiment of this invention, there is provided an improved image processing device that includes, for example, a data writing circuit, a second memory, a coordinate generating circuit, a maximum deviation amount calculating circuit, a division number calculating circuit, a read address generating circuit, a burst length calculating circuit, and a data transferring circuit. The data writing circuit writes image data to a first memory. The second memory has a line memory with a capacity of a plurality of lines to store the image data transferred from the first memory. The coordinate generating circuit generates coordinate information based on inclination information. The coordinate information includes a coordinate in a main scanning direction and a coordinate in a sub-scanning direction that together represent a position of each of pixels of the image data relative to an output medium onto which the image data is to be output. The inclination information represents an inclination of the image data in the first memory relative to the output medium. The maximum deviation amount calculating circuit calculates a maximum deviation amount in the sub-scanning direction of the image data from the coordinate information. The division number calculating circuit calculates a division number for dividing the image data in the main scanning direction, based on a number of the lines of the second memory and the maximum deviation amount in the sub-scanning direction of the image data. The read address generating circuit generates a read start address for reading from the first memory each of divided areas of the image data divided by the division number. The burst length calculating circuit calculates a burst length based on the division number and a width of the image data in the main scanning direction. The data transferring circuit reads the divided areas of the image data from the first memory and burst-transfers the divided areas of the image data to the second memory based on the read start address and the burst length.

In one embodiment of this invention, there is provided an improved image forming apparatus that includes, for example, an image reading device, the above-described image processing device, and an image output device. The image reading device reads a document to generate image data of the document. The image processing device performs image processing on the image data. The image output device forms and outputs an image on an output medium based on the image data subjected to the image processing.

In one embodiment of this invention, there is provided an improved image processing method that includes, for example: writing image data to a first memory; transferring the image data from the first memory to a second memory having a line memory with a capacity of a plurality of lines; generating coordinate information based on inclination information, the coordinate information including a coordinate in a main scanning direction and a coordinate in a sub-scanning direction that together represent a position of each of pixels of the image data relative to an output medium onto which the image data is to be output, and the inclination information representing an inclination of the image data in the first memory relative to the output medium; calculating a maximum deviation amount in the sub-scanning direction of the image data from the coordinate information; calculating a division number for dividing the image data in the main scanning direction, based on a number of the lines of the second memory and the maximum deviation amount in the sub-scanning direction of the image data; generating a read start address for reading from the first memory each of divided areas of the image data divided by the division number; calculating a burst length based on the division number and a width of the image data in the main scanning direction; and reading the divided areas of the image data from the first memory and burst-transferring the divided areas of the image data to the second memory based on the read start address and the burst length.

In one embodiment of this invention, there is provided a non-transitory recording medium storing a program for causing a computer to execute the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 15 is a flowchart illustrating a process of determining the division number in the main scanning direction of image data;

DETAILED DESCRIPTION

Figure 1:
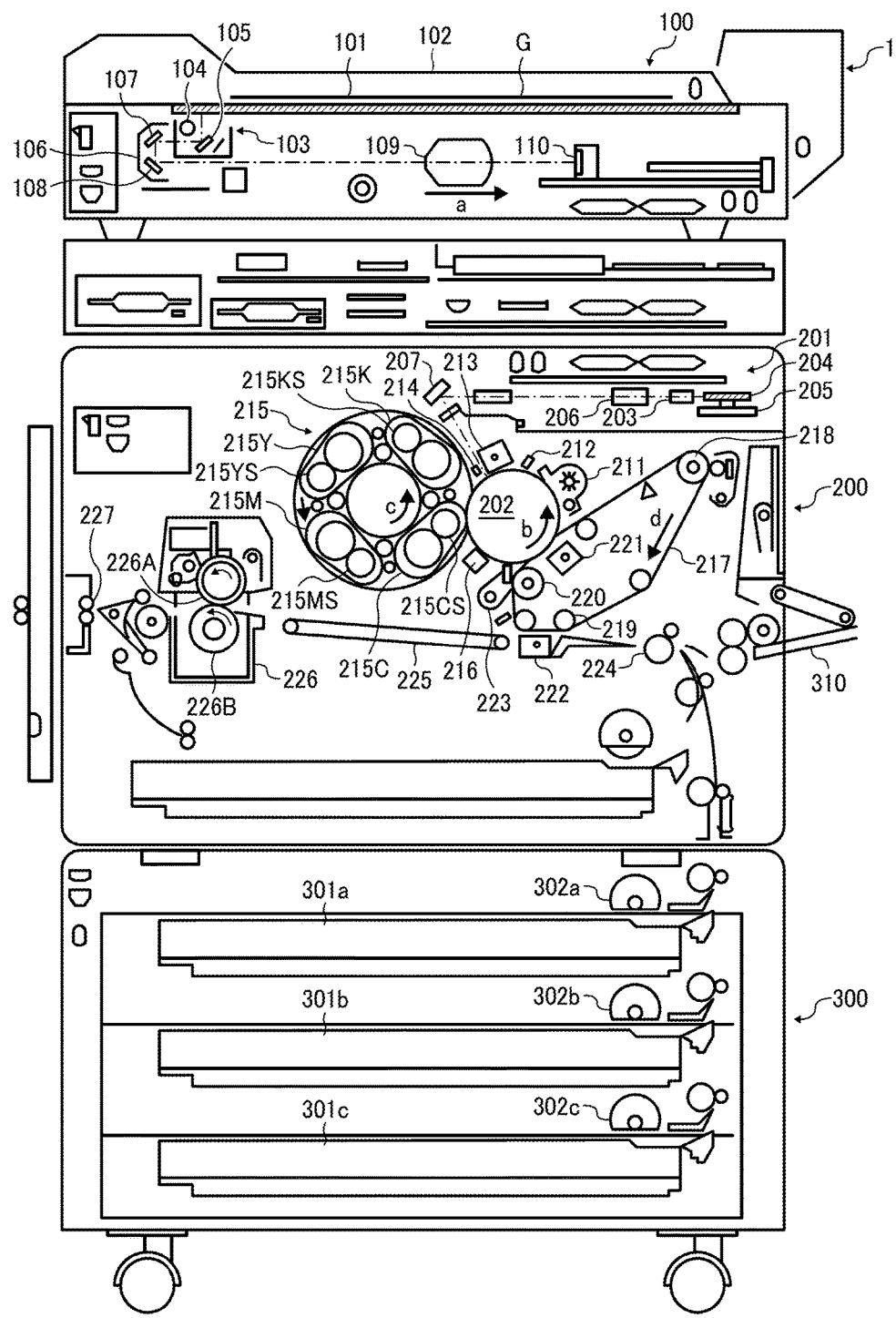
FIG. 1 is a diagram illustrating a configuration of a multifunction peripheral according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

To correct image data to cancel an inclination and distortion of a scanning line of the image data, an interpolation process using pixels around a bend portion of the scanning line is typically performed with line buffers. The capacity of the line buffers used in the interpolation process replies on the width of the bend of the scanning line, and an increase in the number of buffer lines according to an increase in the width of the bend of the scanning line results in an increase in cost.

Further, in typical divided transfer in which the image data is transferred as divided into segments, the division number for dividing the image data into the segments the burst length of burst transfer are fixed. If the burst length is short, therefore, the data transfer efficiency is reduced. Further, the burst length not dynamically changeable in accordance with the image processing limits the usability of the divided transfer.

Referring now to the accompanying drawings, wherein like reference numerals designate identical or corresponding parts throughout the several views, embodiments of the present invention will be described in detail. The following embodiments of the present invention may include various technically favorable limitations. The following description, however, should not unduly limit the scope of the present invention. Further, not all configurations described in the embodiments are required components of the present invention.

FIG. 1 to FIG. 17 are drawings for describing an image processing device, an image forming apparatus, an image processing method, and a non-transitory recording medium according to an embodiment of the present invention. FIG. 1 is a diagram illustrating a configuration of a multifunction peripheral 1 as an image forming apparatus according to the present embodiment.

In FIG. 1, the multifunction peripheral 1 serving as an image forming apparatus includes a scanner 100, a printer 200, and a sheet feeding unit 300.

In the scanner 100, which serves as an image reading device, a document G is placed on a contact glass 101 and pressed by a pressure plate 102. The document G is then irradiated with light from an illuminating lamp 104, which is a light source of a first carriage 103 disposed below the contact glass 101. The light is reflected by the document G and then sequentially by a mirror 105 of the first carriage 103 and mirrors 107 and 108 of a second carriage 106 to be incident on a 3-line charge coupled device (CCD) sensor 110 through a lens 109. The 3-line CCD sensor 110 photoelectrically converts the incident light to the image of the document G. In the reading of the image of the document G, the first carriage 103 and the second carriage 106 move in a sub-scanning direction while scanning the document G in a main scanning direction, to thereby scan the document G both in the main scanning direction and the sub-scanning direction, and the 3-line CCD sensor 110 divides the image into images of red (R), green (G), and blue (B) colors to obtain R, G, and B color component image signals.

Based on the intensity levels of the R, G, and B color component image signals obtained by the scanner 100, the multifunction peripheral 1 performs a color conversion process with an image processing unit to convert the image of the document G into color image data including information of recording colors: black (K), cyan (C), magenta (M), and yellow (Y).

Based on the color image data, the printer 200, which serves as an image output device, forms and superimposes K, C, M, and Y images on a photoconductive drum 202, which are transferred on an intermediate transfer belt 217. The full-color image having the K, C, M, and Y images superimposed one above the other is then transferred onto a transfer sheet, which serves as an output medium onto which the image data is output, and the transfer sheet having the image formed thereon is output.

Specifically, in response to a start signal, the scanner 100 moves the first carriage 103 and the second carriage 106 to the right in FIG. 1, as indicated by arrow a, to scan the image of the document G. In each scanning operation, the scanner 100 acquires the image data of one color and transmits the image data of the color to the printer 200. The printer 200 sequentially forms and superimposes visible images of the four colors on the intermediate transfer belt 217, to thereby form a full-color image with the four colors.

In the printer 200, an optical writing unit 201 converts the color image data from the scanner 100 into optical signals and performs optical writing in accordance with the image of the document G, to thereby form electrostatic latent images on the photoconductor drum 202.

The optical writing unit 201 includes a laser light emitter 203, a light emitter drive controller for driving the laser light emitter 203, a polygon mirror 204, a rotating motor 205 for driving the polygon mirror 204 to rotate, an fθ lens 206, and a reflecting mirror 207, for example. In the optical writing unit 201, the light emitter drive controller controls light emission of the laser light emitter 203 based on the color image data to emit modulated laser light to the polygon mirror 204. The polygon mirror 204 is driven to rotate by the rotating motor 205 to direct the incident laser light to a surface of the photoconductor drum 202 via lenses and mirrors such as the fθ lens 206 and the reflecting mirror 207 to scan the surface of the photoconductor drum 202 with the laser light. Thereby, the electrostatic latent images are formed on the surface of the photoconductor drum 202.

The photoconductor drum 202 is driven to rotate counterclockwise, as indicated by arrow b. The photoconductor drum 202 is surrounded by a photoconductor cleaning unit 211, a discharging lamp 212, a charger 213, a potential sensor 214, a revolver developing device 215 (specifically, a selected one of developing devices 215K, 215C, 215M, and 215Y in the revolver developing device 215), a development density pattern detector 216, and the intermediate transfer belt 217.

The potential sensor 214 detects the electrostatic potential on the surface of the photoconductor drum 202.

The revolver developing device 215 includes the developing devices 215K, 215C, 215M, and 215Y for the K, C, M, and Y colors (hereinafter referred to as K, C, M, and Y developing devices 215K, 215C, 215M, and 215Y), and a revolver rotation driving unit for rotating the K, C, M, and Y developing devices 215K, 215C, 215M, and 215Y counterclockwise, as indicated by arrow c. Each of the K, C, M, and Y developing devices 215K, 215C, 215M, and 215Y includes a corresponding one of developing sleeves 215KS, 215CS, 215MS, and 215YS and a developing paddle. The developing sleeves 215KS, 215CS, 215MS, and 215YS rotate while bringing spikes of developer into contact with the surface of the photoconductor drum 202 to render the electrostatic latent images visible. The developing paddles rotate to scoop and stir the developer.

The revolver developing device 215 in a standby state is set to a position for performing development with the K developing device 215K. When a copying operation starts, the scanner 100 starts reading black image data at a predetermined time, and the optical writing to the surface of the photoconductor drum 202 with the laser light starts based on the black image data. With the optical writing, the electrostatic latent image based on the black image data (hereinafter referred to as the K latent image) starts to be formed. The optical writing and the electrostatic latent image formation are similarly performed based on cyan image data, magenta image data, and yellow image data, to thereby form the electrostatic latent images based on the cyan image data, the magenta image data, and the yellow image data, respectively (hereinafter referred to as the C, M, and Y latent images). In the revolver developing device 215, to start developing the K latent image from a leading end portion thereof, the developing sleeve 215KS starts to be rotated before the leading end portion of the K latent image reaches the development position of the K developing device 215K, to thereby develop the K latent image with black toner. The K latent image continues to be developed, and after a trailing end portion of the K latent image passes the development position of the K developing device 215K, the revolver developing device 215 is swiftly driven to rotate from the development position of the K developing device 215K to the development position of the C developing device 215C (i.e., the developing device for the next color). This operation of rotating the revolver developing device 215 is completed at least before a leading end portion of the next C latent image based on the cyan image data reaches the development position of the C developing device 215C.

When an image formation cycle starts, the printer 200 rotates the photoconductor drum 202 counterclockwise, as indicated by arrow b in FIG. 1, and rotates the intermediate transfer belt 217 clockwise, as indicated by arrow d in FIG. 1, with a drive motor. With the rotation of the intermediate transfer belt 217, the printer 200 sequentially forms a black toner image, a cyan toner image, a magenta toner image, and a yellow toner image (hereinafter referred to as the K, C, M, and Y toner images) and superimposes the K, C, M, and Y toner images on the intermediate transfer belt 217 in this order, to thereby form the full-color toner image.

The printer 200 first forms the K toner image as follows. The charger 213 uniformly charges the surface of the photoconductor drum 202 to approximately −700 V with negative charge by corona discharge. Then, the laser light emitter 203 performs the above-described optical writing with the laser light (i.e., raster exposure) based on a black image signal. With this raster exposure, exposed portions of the uniformly charged surface of the photoconductor drum 202 lose charge in proportion to the amount of the laser light (i.e., exposure light), to thereby form the electrostatic latent image, i.e., the K latent image.

The black toner in the K developing device 215K of the revolver developing device 215 is stirred with ferrite carrier to be charged to the negative polarity. The developing sleeve 215KS of the K developing device 215K is applied with a voltage by a power supply circuit. The voltage has a negative direct-current (DC) potential superimposed with an alternating-current (AC) potential. Thereby, the developing sleeve 215KS is electrically biased relative to a metal base layer of the photoconductor drum 202. Therefore, the black toner does not adhere to still charged portions of the surface of the photoconductor drum 202 but is attracted by the discharged, exposed portions of the surface of the photoconductor drum 202, thereby forming the K toner image (i.e., K visible image) corresponding to the K latent image.

The intermediate transfer belt 217 is stretched around a drive roller 218, a transfer facing roller 219, a cleaning facing roller 220, and driven rollers, and is driven to rotate by a drive motor.

Then, a belt-transfer unit 221, which includes a corona discharger, for example, belt-transfers the K toner image formed on the photoconductor drum 202 onto a surface of the intermediate transfer belt 217, which is driven to rotate at a constant speed while in contact with the photoconductor drum 202.

After the belt-transfer, the photoconductor cleaning unit 211 cleans and collects a slight amount of untransferred toner remaining on the surface of the photoconductor drum 202 in preparation for the next use of the photoconductor drum 202, and stores the collected toner in a waste toner tank via a collecting pipe.

The K, C, M, and Y toner images sequentially formed on the photoconductor drum 202 are sequentially positioned and transferred onto the same surface of the intermediate transfer belt 217, to thereby form a belt-transferred, four-color superimposed toner image. Thereafter, a sheet-transfer unit 222, which includes a corona discharger, for example, transfers the K, C, M, and Y toner images onto the transfer sheet at one time.

On the photoconductor drum 202, the cyan image forming process is performed subsequently to the black image forming process. Specifically, the scanner 100 starts reading cyan image data at a predetermined time, and the printer 200 performs the optical writing with the laser light based on the cyan image data, to thereby form the C latent image on the surface of the photoconductor drum 202. The printer 200 drives the revolver developing device 215 to rotate after the trailing end portion of the K latent image passes the development position of the K developing device 215K and before the leading end portion of the C latent image reaches the development position of the C developing device 215C. The printer 200 then develops the C latent image with cyan toner. After a trailing end portion of the C latent image passes the development position of the C developing device 215C, the printer 200 drives the revolver developing device 215 to move the C developing device 215C forward similarly as in the above-described operation of moving the K developing device 215K forward. Thereby, the printer 200 positions the next M developing device 215M to the development position thereof before a leading end portion of the M latent image reaches the development position. The magenta image forming process and the yellow image forming process are similar to the black image forming process and the cyan image forming process described above in the image data reading, the latent image formation, and the image developing operation, and thus description thereof will be omitted.

The intermediate transfer belt 217 is cleaned by a belt cleaning device 223, which includes an entrance seal, a rubber blade, a discharge coil, and a contact-separation mechanism that causes the entrance seal and the rubber blade to contact and separate from the intermediate transfer belt 217. With the contact-separation mechanism, the belt cleaning device 223 keeps the entrance seal and the rubber blade separated from the surface of the intermediate transfer belt 217 during the belt-transfer of the C, M, and Y toner images (i.e., the toner images of the second to fourth colors) following the belt-transfer of the K toner image (i.e., the toner image of the first color).

The sheet-transfer unit 222 applies an AC-DC component or a DC component to the transfer sheet and the intermediate transfer belt 217 by corona discharge, to thereby cause the full-color toner image formed of the superimposed toner images on the intermediate transfer belt 217 to be transferred onto the transfer sheet.

The sheet feeding unit 300 stores a plurality of transfer sheet cassettes 301a, 301b, and 301c to store transfer sheets of different sizes. The sheet feeding unit 300 feeds and conveys a transfer sheet of a specified size from one of the transfer sheet cassettes 301a, 301b, and 301c storing the transfer sheet toward a registration roller pair 224 of the printer 200 with a corresponding one of sheet feeding rollers 302a, 302b, and 302c.

The multifunction peripheral 1 also includes a manual sheet feeding tray 310 provided to a side surface of the printer 200 to store sheets such as overhead projector (OHP) sheets or thick sheets.

When starting the image formation, the multifunction peripheral 1 feeds a transfer sheet from one of the transfer sheet cassettes 301a, 301b, and 301c or the manual sheet feeding tray 310, and causes the transfer sheet to stop and stand by at a nip portion formed between rollers of the registration roller pair 224. The multifunction peripheral 1 then drives the registration roller pair 224 to feed the transfer sheet such that a leading end portion of the transfer sheet meets a leading end portion of the toner image on the intermediate transfer belt 217 when the leading end portion of the toner image reaches the sheet-transfer unit 222. Thereby, the toner image and the transfer sheet are properly positioned relative to each other. When the transfer sheet passes over the sheet-transfer unit 222, which is connected to a positive potential, the four-color superimposed toner image on the intermediate transfer belt 217 is superimposed on the transfer sheet. In this process, the transfer sheet is charged with positive charge by a corona discharge current, and most of the toner image is transferred onto the transfer sheet. The transfer sheet then passes a sheet separating and discharging unit including a discharging brush, which is provided on the left side of the sheet-transfer unit 222 in FIG. 1. Thereby, the transfer sheet is discharged and separated from the intermediate transfer belt 217, and is moved to a sheet conveyance belt 225. The sheet conveyance belt 225 conveys the transfer sheet to a fixing unit 226. In the fixing unit 226, the superimposed toner images of the four colors transferred to the transfer sheet at one time from the surface of the intermediate transfer belt 217 are fused and fixed on the transfer sheet at a nip portion formed between a fixing roller 226A and a pressure roller 226B controlled to a predetermined temperature. The transfer sheet having the toner images fixed thereon is discharged to the outside of the multifunction peripheral 1 by a discharge roller pair 227 to be placed face-up on a copy tray.

After the belt-transfer of the toner images to the intermediate transfer belt 217 from the photoconductor drum 202, the photoconductor cleaning unit 211, which includes components such as a brush roller and a rubber blade, cleans the surface of the photoconductor drum 202, and the discharging lamp 212 uniformly discharges the surface of the photoconductor drum 202. Further, after the sheet-transfer of the toner images to the transfer sheet from the intermediate transfer belt 217, the belt cleaning device 223 again cleans the surface of the intermediate transfer belt 217 by pressing the rubber blade against the surface of the intermediate transfer belt 217 with the contact-separation mechanism.

In the case of a repeat copy job of making a plurality of copies of a single original document, the multifunction peripheral 1 performs the operation of the scanner 100 and the image formation on the photoconductor drum 202 by proceeding, at a predetermined time, from the process of forming the image of the fourth color for the first page to the process of forming the image of the first color for the second page. In the process of forming the image of the first color for the second page, the multifunction peripheral 1 belt-transfers the K toner image for the second page onto an area of the surface of the intermediate transfer belt 217 cleaned by the belt cleaning device 223 after the superimposed toner images of the four colors for the first page are transferred at one time onto the transfer sheet from the intermediate transfer belt 217. Thereafter, the multifunction peripheral 1 performs an operation similar to the operation performed for the first page.

Figure 2:
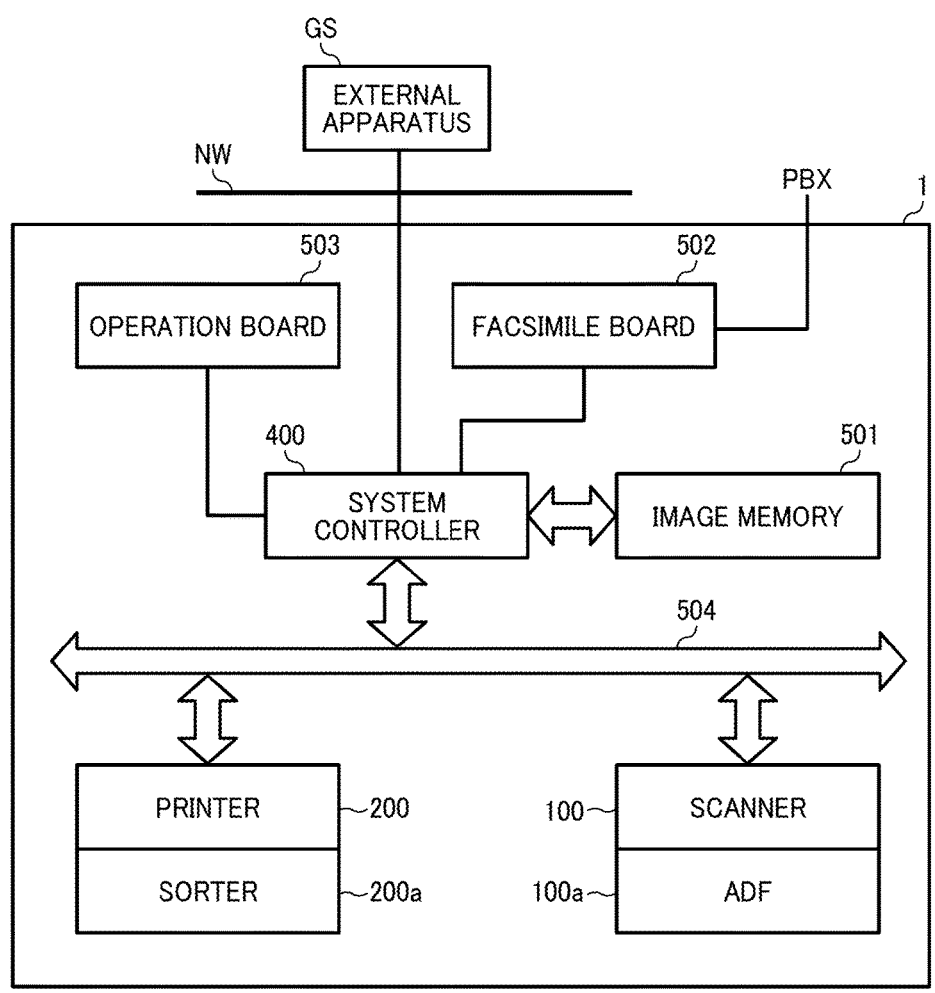
FIG. 2 is a block diagram illustrating a circuit configuration of the multifunction peripheral illustrated in FIG. 1.

As illustrated in FIG. 2, the multifunction peripheral 1 is provided with a print instruction command and print data (i.e., image data) by an external host apparatus (hereinafter referred to as the external apparatus) GS such as a personal computer via a network NW such as a local area network (LAN) or a parallel interface (I/F), for example. Provided with the print data, the multifunction peripheral 1 prints out (i.e., outputs the image of) the print data with the printer 200. The multifunction peripheral 1 further transmits the image data of the document G read by the scanner 100 to a facsimile machine at a remote site, and prints out image data received from the facsimile machine. The multifunction peripheral 1 is connected to a public telephone network via a private branch exchange (PBX) to perform facsimile communication or communication with an administration server of a service center via the public telephone network. The multifunction peripheral 1 of the present embodiment is a digital full-color copier with multiple functions including the above-described functions.

A circuit configuration of the multifunction peripheral 1 is illustrated as blocks in FIG. 2. In addition to the scanner 100 and the printer 200 described above, the multifunction peripheral 1 includes a system controller 400, an image memory 501, a facsimile board 502, an operation board 503, a sorter 200*a*, and an automatic document feeder (ADF) 100*a*. The system controller 400 is connected to the image memory 501. The system controller 400, the scanner 100, and the printer 200 are connected by a bus such as a peripheral component interconnect express (PCIe) bus 504.

The system controller 400 is connected to the external apparatus GS such as a computer via the network NW such as a LAN. The system controller 400 exchanges image data and commands with the external apparatus GS via the network NW, and operates based on image data and commands received from the external apparatus GS.

The operation board 503 includes a variety of operation keys and a display, and is connected to the system controller 400. The operation board 503 outputs operations performed with the operation keys to the system controller 400, and outputs and displays data from the system controller 400 on the display.

The sorter 200*a* is installed to the printer 200. When the printer 200 prints a plurality of copies, the sorter 200*a* sorts and places printed sheets by copies.

The ADF 100*a* is installed to the scanner 100. A plurality of documents are placed on the ADF 100*a*, and the ADF 100*a* feeds the placed documents one by one to the scanner 100.

The facsimile board 502 is connected to the system controller 400, and is also connected to the public telephone network via the PBX to transmit and receive facsimile data via the public telephone network.

The image memory 501, which serves as a first memory, is connected to the system controller 400. Under control of the system controller 400, the image memory 501 stores the image data received from the external apparatus GS and the image data read by the scanner 100. Further, under control of the system controller 400, the image data stored in the image memory 501 is read to be used in the image formation by the printer 200, the facsimile transmission by the facsimile board 502, or the data transfer via the network NW. The image memory 501 is also used as a page memory in which the image data read by the scanner 100 or the image data to be output to the printer 200 is stored in page units.

For example, the multifunction peripheral 1 executes a job by storing the image data read by the scanner 100 in the image memory 501 and using the stored image data later or by outputting the image data to the printer 200 without storing the image data in the image memory 501.

The multifunction peripheral 1 stores the image data in the image memory 501 when printing a plurality of copies of the single document G, for example. In this case, the multifunction peripheral 1 operates the scanner 100 once to read the image data, stores the read image data in the image memory 501, and prints the copies with the printer 200 by reading the stored image data from the image memory 501 multiple times.

The multifunction peripheral 1 does not store the image data in the image memory 501 when printing a single copy of the single document G, for example. In this case, the multifunction peripheral 1 directly outputs the image data read by the scanner 100 to the printer 200 without writing the image data to the image memory 501.

Further, the multifunction peripheral 1 may store the image data in the image memory 501 and perform an additional process, such as rotation of an image or synthesis of images, for example, when reading the image data from the image memory 501. In this case, the system controller 400 of the multifunction peripheral 1 performs access control of the image memory 501, deployment (e.g., character code/character bit conversion) of the print data from the external apparatus GS, and compression and decompression of image data for effective use of the image memory 501. The multifunction peripheral 1 transmits the image data to the image memory 501, compresses and stores the transmitted image data in the image memory 501, and reads the stored image data as necessary. The multifunction peripheral 1 decompresses the read image data in the image memory 501 to restore the original image data.

With the above-described flow of image data, the multifunction peripheral 1 performs data transfer through the PCIe bus 504 under bus control of the system controller 400, to thereby achieve the multiple functions.

In the present embodiment, if the input image data has a steep inclination, the multifunction peripheral 1 uses a later-described internal memory 419 in FIG. 4 included in the system controller 400 to temporarily store the image data to correct the inclination.

Figure 3:
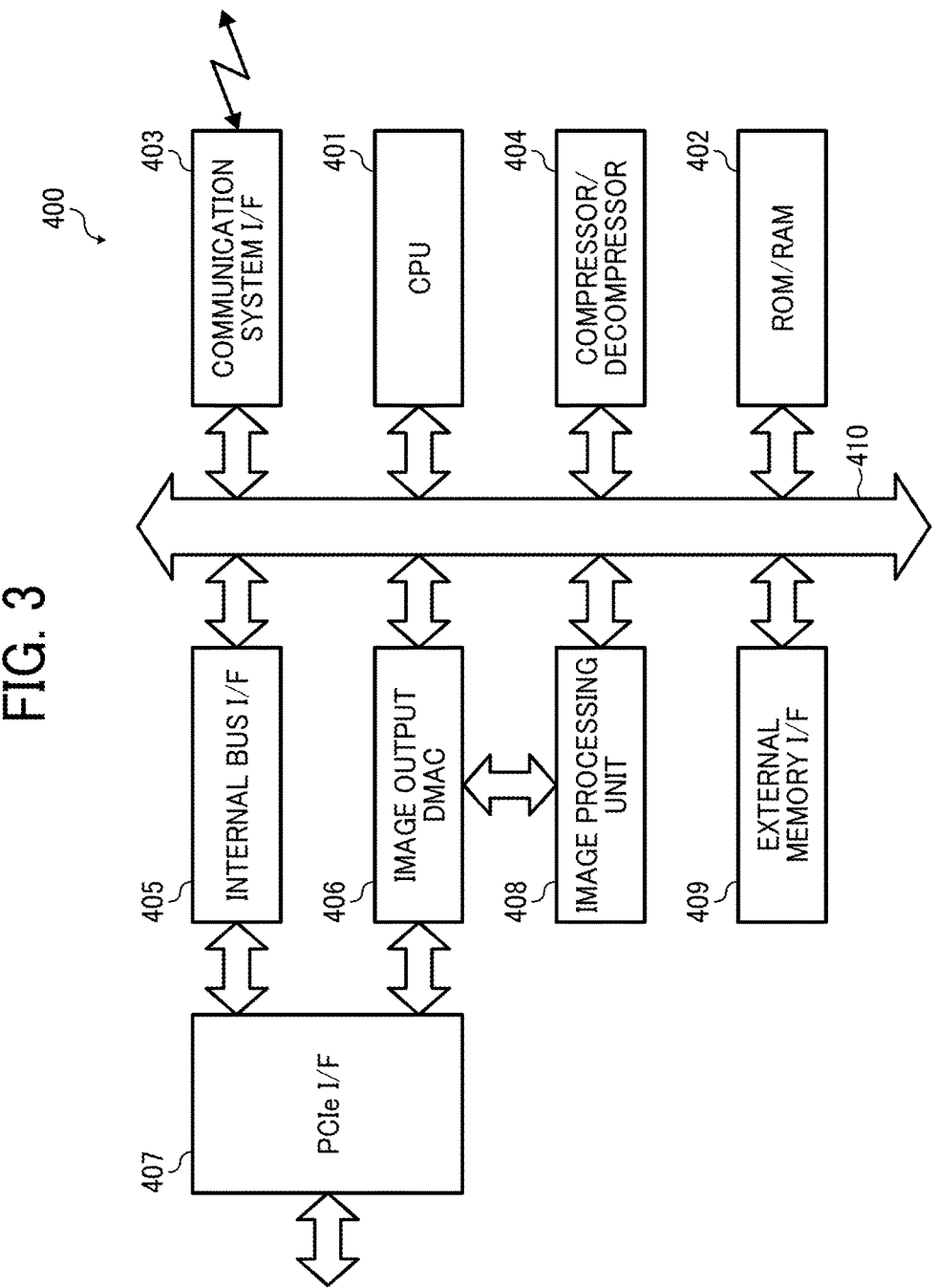
FIG. 3 is a block diagram illustrating a configuration of a system controller of the multifunction peripheral.

As illustrated in FIG. 3, the system controller 400 includes a central processing unit (CPU) 401, a read-only memory/random access memory (ROM/RAM) 402, a communication system I/F 403, a compressor/decompressor 404, an internal bus I/F 405, an image output direct memory access controller (DMA controller or DMAC) 406, a PCIe I/F 407, an image processing unit 408, and an external memory I/F 409, which are connected by an internal bus 410.

The CPU 401 executes a variety of arithmetic processes, and controls all settings of the multifunction peripheral 1 and the activation of the image output DMAC 406, the compressor/decompressor 404, and the image processing unit 408. Further, the CPU 401 writes the image data received from the external apparatus GS to the image memory 501 as printable rendering data via the external memory I/F 409 based on a printer language.

The external memory I/F 409 is connected to the internal bus 410 and the image memory 501 to exchange data between the image memory 501 and the system controller 400 under control of the CPU 401.

The ROM/RAM 402 includes a ROM to store a basic program of the multifunction peripheral 1, system data, a program for executing the image processing method according to the present embodiment, and data for use in executing the image processing method according to the present embodiment. The ROM/RAM 402 further includes a RAM to be used as a work memory of the CPU 401 and to temporarily store image data.

The communication system I/F 403 is an interface between the external apparatus GS, the operation board 503, the facsimile board 502, and the system controller 400 to transmit and receive data to and from the CPU 401 via the image memory 501 or an internal register.

The PCIe I/F 407 is connected to the PCIe bus 504 to exchange data with a PCIe bus master in accordance with the protocol of the PCIe bus 504.

The internal bus I/F 405 is an interface between the PCIe I/F 407 and the internal bus 410 to perform data input to or data output from the image memory 501 via the external memory I/F 409 in response to specification of an address and data by the PCIe bus master.

The system controller 400 writes the image data read by the scanner 100 to the image memory 501 via the PCIe I/F 407, the internal bus I/F 405, the internal bus 410, and the external memory I/F 409 in FIG. 3.

The image output DMAC 406 is connected to the internal bus 410 and the PCIe I/F 407, and functions as a DMA controller in the printing operation. That is, the image output DMAC 406 is activated by the CPU 401 to read image data from a previously specified area in the image memory 501 and output the image data by handshaking with the PCIe I/F 407 as appropriate. The PCIe bus master of the PCIe bus 504 normally directly accesses the image memory 501 connected thereto via the internal bus I/F 405 of the system controller 400. In this case, however, the PCIe bus master accesses a predetermined address in a memory space of the image memory 501 predetermined by PCIe configuration settings. When reading and transferring image data from the image memory 501 to the printer 200, therefore, the system controller 400 transfers the image data via the external memory I/F 409, the internal bus 410, the image output DMAC 406, and the PCIe I/F 407 in FIG. 3. Thereby, a read response time of the PCIe bus 504 for outputting the image data is reduced.

The compressor/decompressor 404 is activated and controlled by the CPU 401 to compress and decompress a variety of data to reduce the data capacity of the image memory 501.

The image processing unit 408 operates under control of the CPU 401 to perform a variety of image processing, particularly the correction of the inclination of the image data, such as the image data read by the scanner 100, for example. When the multifunction peripheral 1 conveys the document G to the scanner 100 with the ADF 100a, an inclination (i.e., positional distortion) occurs in the document G read by the scanner 100, depending on the mechanical precision of related components. If the multifunction peripheral 1 causes the printer 200 to print the image data of the document G read by the scanner 100 without correcting the inclination, therefore, the image data is printed as rotated by a slight angle in accordance with the inclination of the document G.

The multifunction peripheral 1, therefore, detects a skew (i.e., an angle of inclination) of the document G conveyed to a document reading position of the scanner 100 by using a skew sensor, and the image processing unit 408 performs image processing on the image data of the document G based on the detected skew to correct the inclination.

Figure 4:
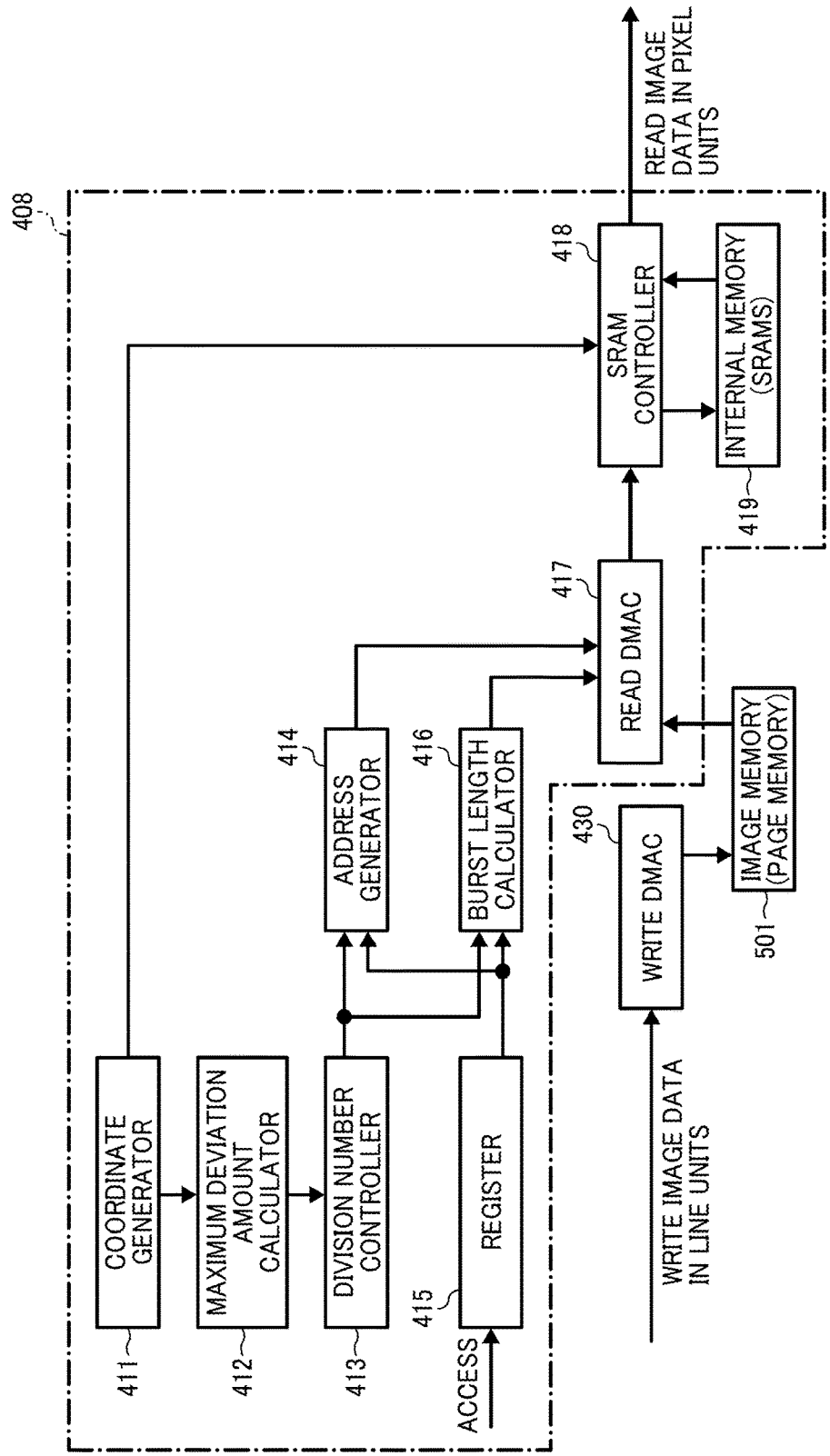
FIG. 4 is a block diagram illustrating a configuration of an image processing unit of the system controller.

Specifically, the image processing unit 408 temporarily stores the image data of the document G read by the scanner 100 in the image memory 501, reads the image data from the image memory 501 with memory addresses based on addressing for correcting the inclination, and captures the thus-read image data in the internal memory 419 in FIG. 4. The image processing unit 408 further reads and transmits the thus-captured image data from the internal memory 419 to the printer 200 to print the image data. When the image processing unit 408 corrects the inclination of the image data, the system controller 400 transfers the image data to the printer 200 via the external memory I/F 409, the internal bus 410, the image processing unit 408, the image output DMAC 406, and the PCIe I/F 407 in FIG. 3. Thereby, the image data is transferred to the printer 200 with the inclination thereof corrected. The multifunction peripheral 1 determines whether or not to perform the inclination correction on the image data by transferring the image data via the image processing unit 408, in accordance with whether an inclination correcting function is turned on or off with an inclination correction key of the operation board 503, for example.

The image processing unit 408 has a configuration illustrated as blocks in FIG. 4, and functions as an image processing device. As illustrated in FIG. 4, the image processing unit 408 includes a coordinate generator 411, a maximum sub-scanning direction deviation amount calculator (hereinafter simply referred to as the maximum deviation amount calculator) 412, a main scanning direction division number controller (hereinafter simply referred to as the division number controller) 413, an address generator 414, a register 415, a burst length calculator 416, a read DMAC 417, a static random access memory (SRAM) controller 418, and the internal memory 419.

Further, a write DMAC 430 is arranged near the image processing unit 408. The write DMAC 430, which serves as a data writing circuit, writes image data in line units to a page memory area formed in the image memory 501. The write DMAC 430 and the read DMAC 417 of the image processing unit 408 are formed of the external memory I/F 409, for example.

The image processing unit 408 reads from the image memory 501 the image data written thereto while correcting the inclination of the image data, writes the image data to the internal memory 419, and performs image processing on the image data to be output to an external device.

Figure 5:
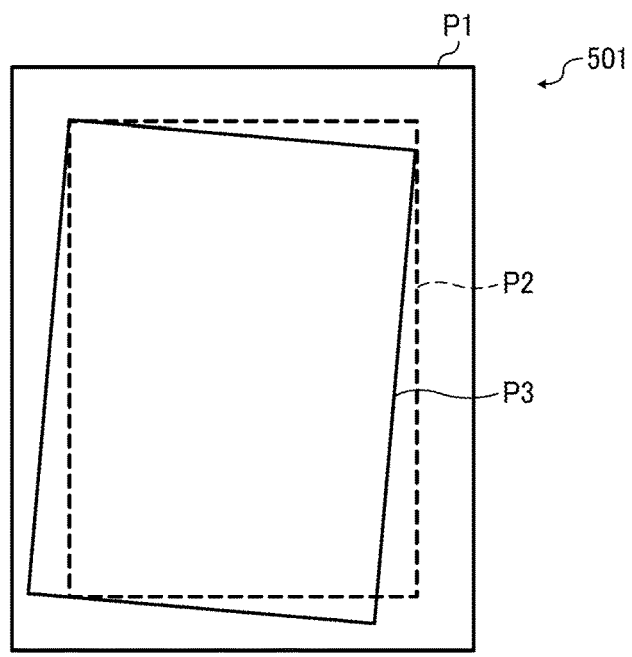
FIG. 5 is a diagram illustrating a page memory area in an image memory of the multifunction peripheral.

As illustrated in FIG. 5, the page memory area of the image memory 501 is greater than the capacity of one page of image data. In FIG. 5, an outer frame indicated by a solid line represents a page memory area P1, and an inner frame indicated by a broken line represents a normal page memory area P2 in which one page of image data is writable when the image data has no inclination. Further, in FIG. 5, an inner frame indicated by a solid line represents an actual image area P3 in which actual image data written to the image memory 501 is written with an inclination.

The internal memory 419 serves as a second memory, and is formed of several (n) SRAMs to reduce cost. The following description will be given on the assumption that the internal memory 419 is formed of eight SRAMs (i.e., n=8) in the present example.

The coordinate generator 411 generates a line synchronization signal, and generates coordinate information based on inclination information. The coordinate information includes the coordinate in the main scanning direction and the coordinate in the sub-scanning direction that together specify the position of each of output pixels of the image data. The inclination information represents the inclination in the main scanning direction of the image data relative to the sub-scanning direction. Herein, the image data is of the document G scanned in the main scanning direction and the sub-scanning direction by the scanner 100. The inclination information representing the inclination of the image data corresponds to the inclination (i.e., skew) detected by the skew sensor that detects the inclination (i.e., skew) of the document G conveyed to the document reading position of the scanner 100. The coordinate information is two-dimensional coordinates (X, Y) of each of the pixels of the input image data, and indicates the reading position for accurately reading the pixel in the main scanning direction in consideration of the inclination of the input image data. The coordinate generator 411 therefore functions as a coordinate generating circuit that generates the coordinate information, which includes the coordinate in the main scanning direction and the coordinate in the sub-scanning direction that together represent the position of each of the pixels of the image data relative to the output medium onto which the image data is to be output, based on the inclination information representing the inclination of the image data in the image memory 501 relative to the output medium. The coordinate generator 411 outputs the generated coordinate information to the maximum deviation amount calculator 412 and the SRAM controller 418.

The maximum deviation amount calculator 412 calculates a maximum deviation amount ΔY in the sub-scanning direction for each of lines of the input image data based on the Y coordinates generated by the coordinate generator 411.

Figure 6:
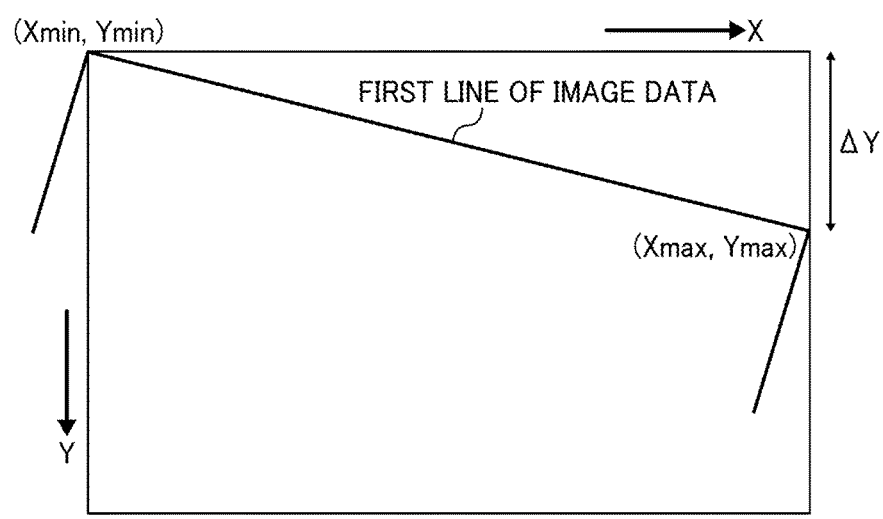
FIG. 6 is a diagram illustrating a process of calculating a maximum deviation amount in a sub-scanning direction.

It is assumed here that the image data is inclined downward to the right, as indicated by a thick solid line in FIG. 6, and that the maximum deviation amount calculator 412 has received the coordinates (X, Y) of one line (e.g., the first line) of the image data from the coordinate generator 411. In this case, the maximum deviation amount calculator 412 detects a minimum value Ymin and a maximum value Ymax from the Y coordinates of the received coordinates (X, Y). The maximum deviation amount calculator 412 then calculates the difference between the minimum value Ymin and the maximum value Ymax of the Y coordinates (i.e., Ymax−Ymin), and determines the difference as the maximum deviation amount ΔY in the sub-scanning direction of the image data, i.e., ΔY=Ymax−Ymin. The maximum deviation amount calculator 412 calculates the maximum deviation amount ΔY in the sub-scanning direction of the image data as the number of lines, and outputs the calculated maximum deviation amount ΔY in the sub-scanning direction of the image data to the division number controller 413. The maximum deviation amount calculator 412 therefore functions as a maximum deviation amount calculating circuit that calculates the maximum deviation amount ΔY in the sub-scanning direction of the image data from the coordinate information.

The division number controller 413 determines a main scanning division number (hereinafter simply referred to as the division number) for dividing the image data in the main scanning direction based on the maximum deviation amount ΔY in the sub-scanning direction.

The internal memory 419 is formed of the n (eight in the present example) SRAMs, as described above. Thus, one page of image data read from the image memory 501 is not stored in the internal memory 419 at one time.

The division number controller 413 therefore determines the division number by which the image data to be read from the image memory 501 is equally divided in the main scanning direction based on the maximum deviation amount ΔY in the sub-scanning direction and the width in the main scanning direction (hereinafter referred to as the main scanning width) of the image data. For example, the main scanning width of image data having a resolution of 1200 dots per inch (dpi) corresponds to 16384 pixels.

Figure 7:
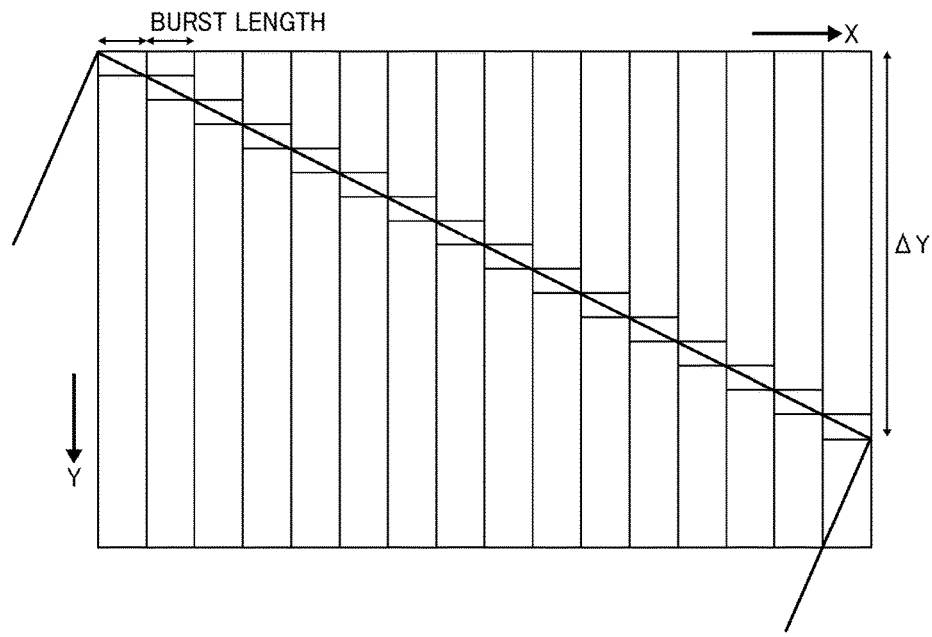
FIG. 7 is a diagram illustrating the relationship between the maximum deviation amount in the sub-scanning direction and a division number when the image data is divided into 16 areas in a main scanning direction.
Figure 8:
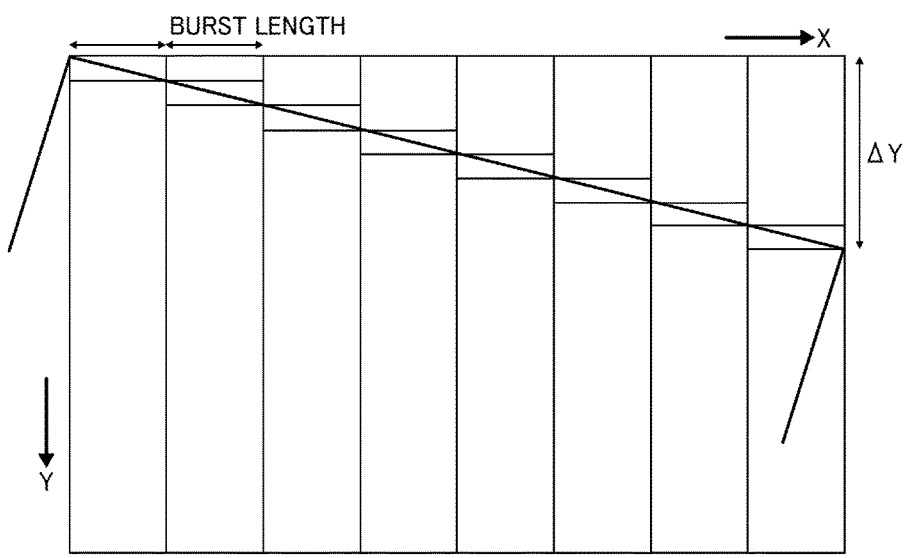
FIG. 8 is a diagram illustrating the relationship between the maximum deviation amount in the sub-scanning direction and the division number when the image data is divided into eight areas in the main scanning direction.
Figure 9:
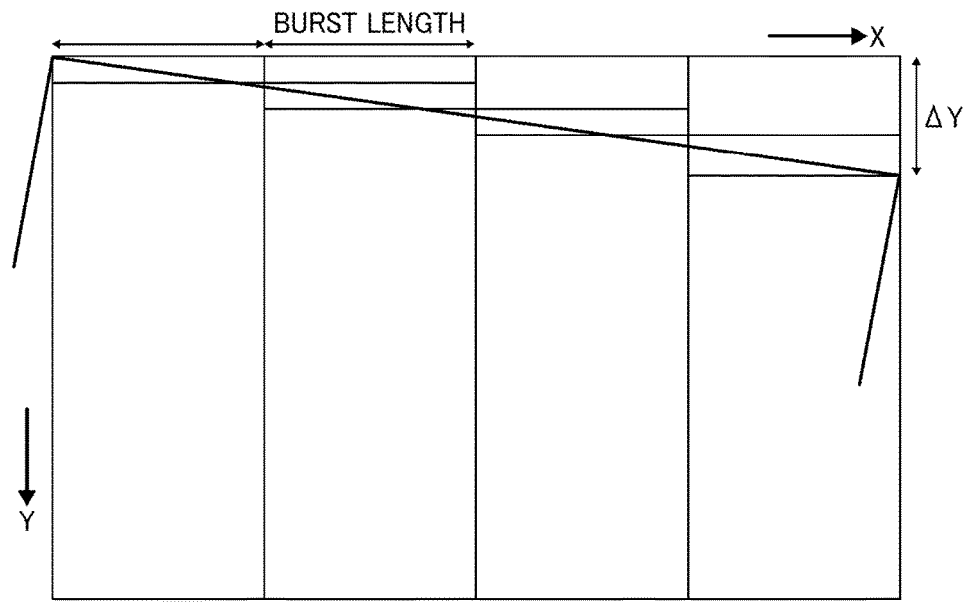
FIG. 9 is a diagram illustrating the relationship between the maximum deviation amount in the sub-scanning direction and the division number when the image data is divided into four areas in the main scanning direction.

Further, for example, if the image data has the maximum deviation amount ΔY in the sub-scanning direction and the main scanning width as illustrated in FIG. 7, the division number controller 413 determines the division number as 16 in consideration of the number n of the SRAMs forming the internal memory 419. The division number controller 413 reduces the division number in accordance with a reduction in the deviation in the sub-scanning direction, i.e., the maximum deviation amount ΔY in the sub-scanning direction, as illustrated in FIGS. 8 and 9. For example, the division number controller 413 determines the division number as 8 in the example of FIG. 8, and determines the division number as 4 in the example of FIG. 9. The division number controller 413 therefore functions as a division number calculating circuit that calculates the division number in the main scanning direction of the image data based on the number of lines of the internal memory 419 and the maximum deviation amount ΔY in the sub-scanning direction.

The system controller 400 divides the inclined image data into rectangular divided areas in the main scanning direction (i.e., X direction) and the sub-scanning direction (i.e., Y direction), reads the divided areas of the image data from the image memory 501, and sequentially burst-transfers the divided areas of the image data to the SRAMs of the internal memory 419.

Figure 10:
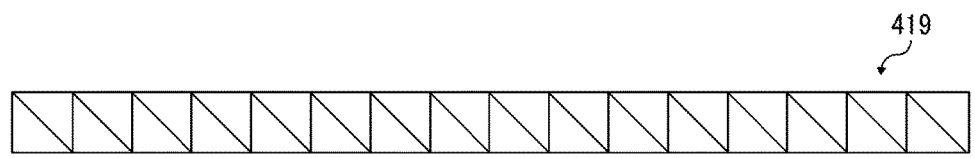
FIG. 10 is a diagram illustrating an example of one line of image data divided into 16 areas and stored in an internal memory of the image processing unit.
Figure 11:
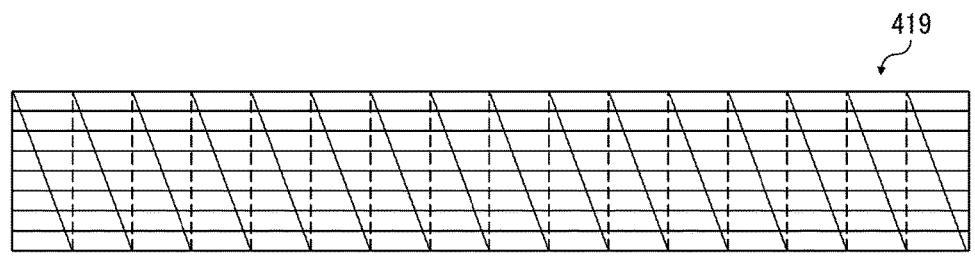
FIG. 11 is a diagram illustrating an example of one line of image data divided into 16 areas and stored in eight SRAMs of the internal memory.

In this case, the system controller 400 sequentially burst-transfers and writes the divided areas of the image data to the internal memory 419, as illustrated in FIG. 10, with the use of the n SRAMs. FIG. 10 illustrates image data divided into 16 divided areas in the main scanning direction, as illustrated in FIG. 7, and written to the internal memory 419. In this case, if the internal memory 419 is formed of eight SRAMs, as described above, the system controller 400 sequentially uses the eight SRAMs in writing the divided areas of the image data, to thereby write one line of the image data to the internal memory 419, as illustrated in FIG. 11. In FIG. 11, the eight areas divided by horizontal solid lines represent the SRAMs forming the internal memory 419, and the image data in these SRAMs is divided into divided areas, as indicated by vertical broken lines.

That is, the system controller 400 changes the division number in accordance with the maximum deviation amount ΔY in the sub-scanning direction, divides the image data by the division number, and writes the divided image data to the internal memory 419 formed of the n SRAMs. Even if a change occurs in the maximum deviation amount ΔY in the sub-scanning direction, therefore, the system controller 400 is capable of writing one line of image data to the internal memory 419 by changing the division number of the image data, i.e., the burst length of the image data in the burst transfer, with no need to increase the number of SRAMs forming the internal memory 419.

The division number controller 413 outputs the determined division number to the address generator 414 and the burst length calculator 416.

Figures 12, 13:
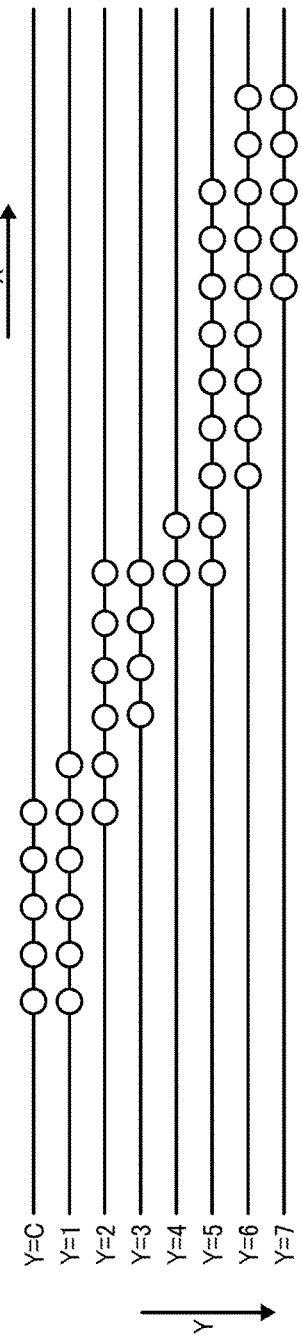
FIG. 12 is a diagram illustrating a configuration example of a register of the image processing unit.
FIG. 13 is a diagram illustrating image data with an inclination.

The register 415 has a configuration illustrated in FIG. 12, for example. The register 415 holds, as register information from the CPU 401, the main scanning width of the image data and settings for turning on or off (i.e., enabling or disenabling) a dividing function of dividing the image data in the main scanning direction. The register 415 outputs the main scanning width and ON/OFF information of the dividing function to the address generator 414 and the burst length calculator 416.

The address generator 414 receives the input of the division number from the division number controller 413 and the ON/OFF information of the dividing function from the register 415.

The ON/OFF information of the dividing function is set in the register 415 by the CPU 401 of the system controller 400 in accordance with an ON/OFF operation performed with a dividing function setting key of the operation board 503. The dividing function setting key therefore functions as a selecting circuit that selects between causing the division number controller 413 to calculate the division number and fixing the division number to a predetermined division number. The predetermined division number set as a fixed value is a value previously determined by specifications of the multifunction peripheral 1.

If the dividing function is on, the address generator 414 generates read start addresses for reading the image data from the image memory 501 (i.e., a page memory) by burst transfer based on the division number and the main scanning width, and outputs the generated read start addresses to the read DMAC 417. The address generator 414 therefore functions as a read address generating circuit that generates the read start address for each of the divided areas of the image data divided by the division number and read from the image memory 501 (i.e., the first memory).

The burst length calculator 416 receives the input of the division number from the division number controller 413 and the main scanning width and the ON/OFF information of the dividing function from the register 415. If the dividing function is on, the burst length calculator 416 calculates, based on the main scanning width and the division number, the burst length of the image data to be divided and transferred from the image memory 501, and outputs the calculated burst length to the read DMAC 417. The burst length calculator 416 therefore functions as a burst length calculating circuit that calculates the burst length based on the main scanning width and the division number of the image data.

The read DMAC 417 receives the input of the read start addresses from the address generator 414 and the burst length from the burst length calculator 416. Based on the read start addresses and the burst length, the read DMAC 417 reads the image data from the image memory 501 in units of rectangular divided areas, and transmits the read image data to the SRAM controller 418.

The SRAM controller 418 writes the image data read from the image memory 501 to the internal memory 419 formed of the n SRAMs. The SRAM controller 418 further receives the input of the coordinates (X, Y) generated by the coordinate generator 411, generates the addresses of the written image data based on the coordinates (X, Y), and reads the image data from the internal memory 419 in pixel units based on the generated addresses, to thereby correct the inclination of the image data.

The read DMAC 417 and the SRAM controller 418 therefore cooperate to function as a data transferring circuit that reads the divided areas of the image data from the image memory 501 based on the read start addresses and the burst length and burst-transfers the read divided areas of the image data to the internal memory 419.

The multifunction peripheral 1 of the present embodiment is configured as an image forming apparatus that reads, from a computer-readable recording medium, the program for executing the image processing method according to the present embodiment, and installs the program to the ROM/RAM 402, for example. The computer-readable recording medium may be a ROM, an electrically erasable and programmable ROM (EEPROM), an erasable and programmable ROM (EPROM), a flash memory, a flexible disk, a compact disc-ROM (CD-ROM), a CD-rewritable (CD-RW), a digital versatile disk (DVD), a universal serial bus (USB) memory, a secure digital (SD) card, or a magneto-optical (MO) disc, for example. The program for executing the image processing method according to the present embodiment is a computer-executable program described in a legacy programming language or an object-oriented programming language, such as assembler, C, C++, C#, or Java (registered trademark), and may be distributed as stored in the above-described recording medium.

With the execution of the program, the image processing unit 408 is realized which serves as the image processing device of the image forming apparatus to execute the image processing method according to the present embodiment of changing the division number of the image data to optimize the burst length in the burst transfer of the image data.

Operations of the present embodiment will now be described.

In the multifunction peripheral 1 of the present embodiment, the image processing unit 408 changes the division number of the image data to optimize the burst length in the burst transfer of the image data.

It is assumed here that the image data read by the scanner 100 is inclined in the main scanning direction relative to the sub-scanning direction, as illustrated in FIG. 13, for example. If all of such inclined image data is read into the internal memory 419 to be corrected, the number of lines of the internal memory 419 is increased, resulting in an increase in cost. Further, in the correction of the inclined image data with the use of the internal memory 419 with a small number of SRAMs, if the image data is read from the image memory 501 with a fixed burst length, the data transfer efficiency is reduced, extending the processing time.

In this case, if whether or not the pixels to be processed are on the same line is determined and the burst transfer is performed in units of pixels on the same line to reduce the number of SRAMs of the internal memory 419, the burst length is changed multiple times during the transfer of one line of image data. Such a configuration complicates an addressing process of calculating the burst length and generating the read start addresses, resulting in complication of an address generating circuit and an increase in cost.

In the multifunction peripheral 1 of the present embodiment, therefore, the image processing unit 408 determines the division number for dividing the image data in the main scanning direction based on the maximum deviation amount $\Delta Y$ in the sub-scanning direction of the image data and the number n of the SRAMs of the internal memory 419. The image processing unit 408 then burst-transfers the divided areas of the image data divided by the division number.

Figure 14:
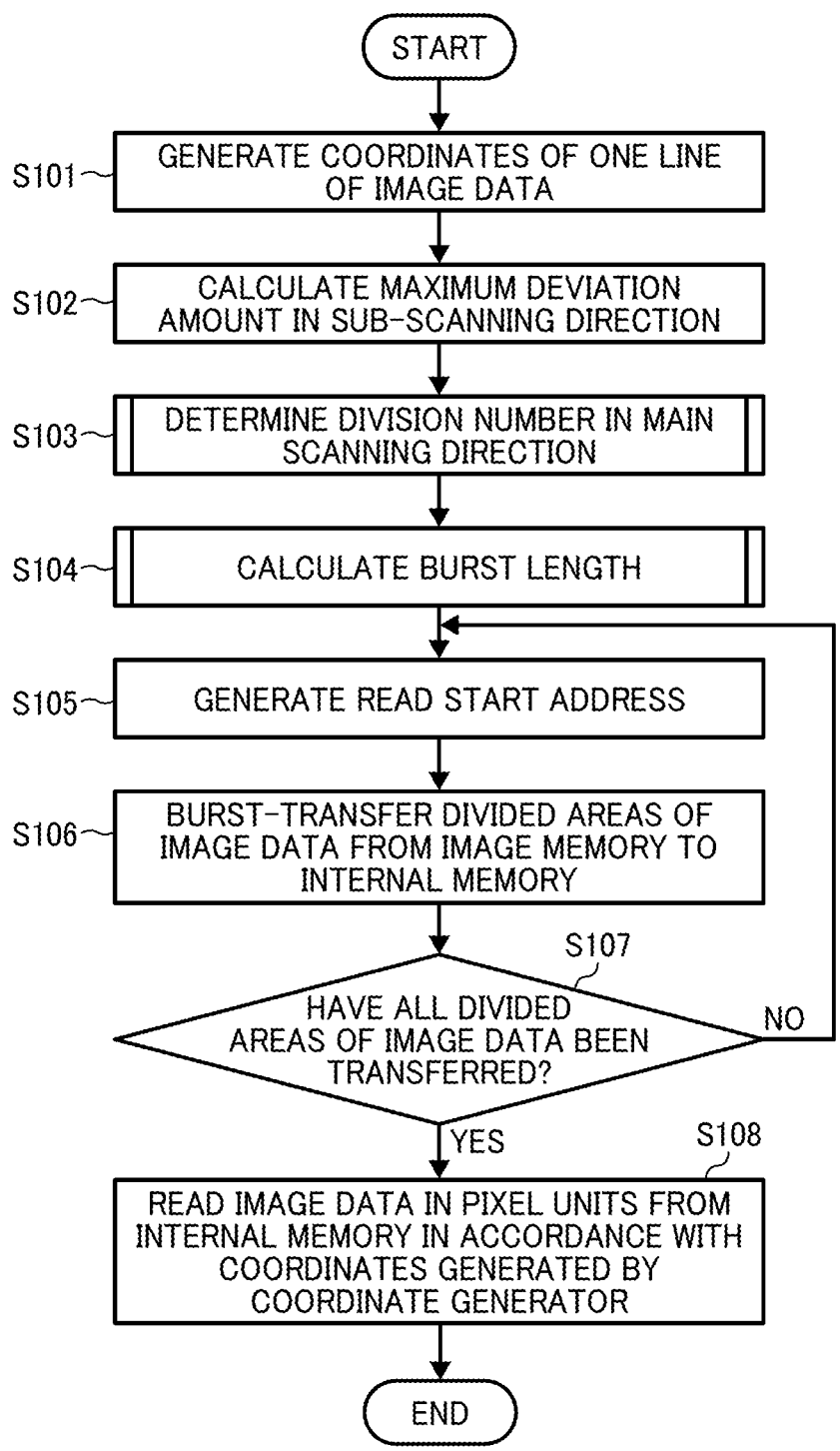
FIG. 14 is a flowchart illustrating a divided transfer process.

Specifically, the image processing unit 408 executes a divided transfer process, as illustrated in the flowchart of FIG. 14. In the image processing unit 408, the coordinate generator 411 first generates the coordinates of one line of the image data based on the inclination detected by the skew sensor, for example, and outputs the generated coordinates to the maximum deviation amount calculator 412 and the SRAM controller 418 (step S101).

As illustrated in FIGS. 7 to 9, the maximum deviation amount calculator 412 calculates the maximum deviation amount ΔY in the sub-scanning direction of the image data from the coordinates, and outputs the calculated maximum deviation amount ΔY in the sub-scanning direction to the division number controller 413 (step S102). As illustrated in FIG. 6, the maximum deviation amount calculator 412 calculates the maximum deviation amount ΔY in the sub-scanning direction as Ymax−Ymin=ΔY from (Xmin, Ymin) and (Xmax, Ymax) of the coordinates (X, Y).

Based on the maximum deviation amount ΔY in the sub-scanning direction and the number n of the SRAMs of the internal memory 419, the division number controller 413 performs a process of determining the division number in the main scanning direction. The division number controller 413 then outputs the determined division umber to the address generator 414 and the burst length calculator 416 (step S103).

Based on the division number and the main scanning width received from the register 415, the burst length calculator 416 calculates the burst length for the burst transfer of the image data from the image memory 501 to the internal memory 419, and outputs the calculated burst length to the read DMAC 417 (step S104).

Based on the division number of the image data, the address generator 414 generates the read start addresses for reading the divided areas of the image data from the image memory 501, and outputs the generated read start addresses to the read DMAC 417 (step S105).

Based on the read start addresses and the burst length, the read DMAC 417 reads the divided areas of the image data from the image memory 501 (i.e., a page memory), and burst-transfers the divided areas of the image data to the SRAM controller 418. The SRAM controller 418 stores in the internal memory 419 the divided areas of the image data transferred in accordance with an instruction from the read DMAC 417 (step S106).

The read DMAC 417 checks if all of the divided areas of the image data have been transferred (step S107).

If any of the divided areas of the image data has not been transferred (NO at step S107), the procedure returns to step 5105 to perform the above-described processes starting from the read start address generation process by the address generator 414 (steps S105 and S106).

If all of the divided areas of the image data have been transferred (YES at step S107), the SRAM controller 418 determines the read address for each of the pixels of the image data in the internal memory 419 based on the coordinates generated by the coordinate generator 411. In accordance with the determined read address, the SRAM controller 418 reads the image data in pixel units from the internal memory 419 such that the inclination of the read image data is corrected, and outputs the image data to the printer 200, for example (step S108). Thereby, the divided transfer process is completed.

The division number controller 413 performs the process of determining the division number in the main scanning direction at step S103 in FIG. 14, as illustrated in the flowchart of FIG. 15. Specifically, the division number controller 413 receives the maximum deviation amount ΔY in the sub-scanning direction calculated by the maximum deviation amount calculator 412 (step S201). Then, based on the maximum deviation amount ΔY in the sub-scanning direction and the number n of the SRAMs of the internal memory 419, the division number controller 413 calculates the division number as ΔY/n (step S202). After calculating the division number, the division number controller 413 checks if the calculation result is equal to or less than 1 (step S203).

If the calculation result is equal to or less than 1 (YES at step S203), the division number controller 413 determines 1 as the division number (step S204), and the process of determining the division number in the main scanning direction is completed.

Figure 16A:
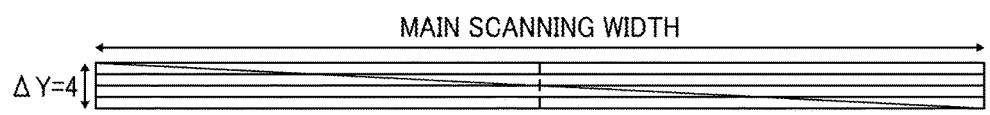
FIGS. 16A to 16D are diagrams illustrating the process of determining the division number in the main scanning direction of image data.
Figure 16B:
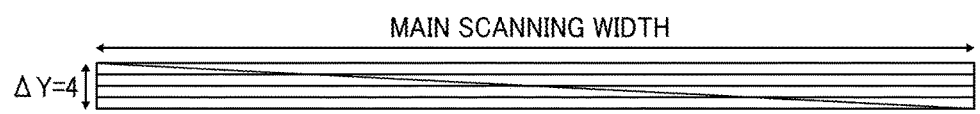

For example, if the internal memory 419 is formed of four SRAMs (i.e., n=4), and if the maximum deviation amount ΔY in the sub-scanning direction is 4 (i.e., ΔY=4), as illustrated in FIG. 16A, the division number ΔY/n is 1. Thus, the image data is not divided, as illustrated in FIG. 16B.

If the calculation result is not equal to or less than 1 NO at step 5203 (NO at step S203), the division number controller 413 checks if the calculation result is a power of two, which simplifies address management (step S205).

If the calculation result is a power of two at step 5205 (YES at step S205), the division number controller 413 determines (i.e., adopts) the calculation result as the division number (step S206), and the process of determining the division number in the main scanning direction is completed.

Figure 16C:
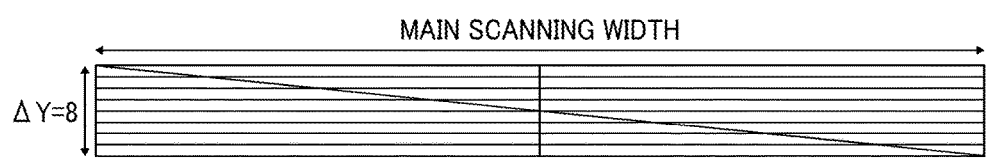

For example, if the internal memory 419 is formed of four SRAMs (i.e., n=4), and if the maximum deviation amount ΔY in the sub-scanning direction is 8 (i.e., ΔY=8), the division number ΔY/n is 2. Thus, the image data is divided by the division number 2, as illustrated in FIG. 16C.

Figure 16D:
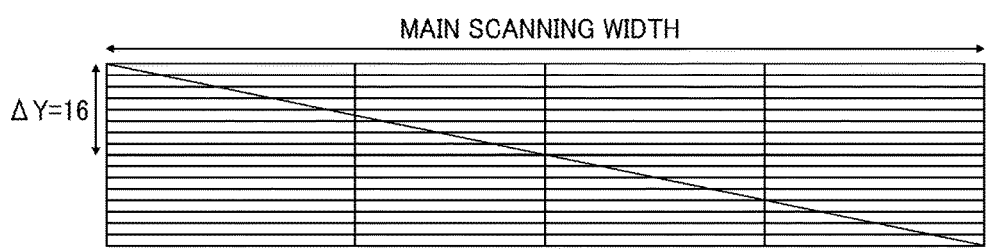

Further, for example, if the internal memory 419 is formed of four SRAMs (i.e., n=4), and if the maximum deviation amount ΔY in the sub-scanning direction is 16 (i.e., ΔY=16), the division number ΔY/n is 4. Thus, the image data is divided by the division number 4, as illustrated in FIG. 16D.

If the calculation result is not a power of two at step S205 (NO at step S205), the division number controller 413 determines (i.e., adopts) a power of two greater than and closest to the calculation result as the division number (step S207), and the process of determining the division number in the main scanning direction is completed.

Figure 17:
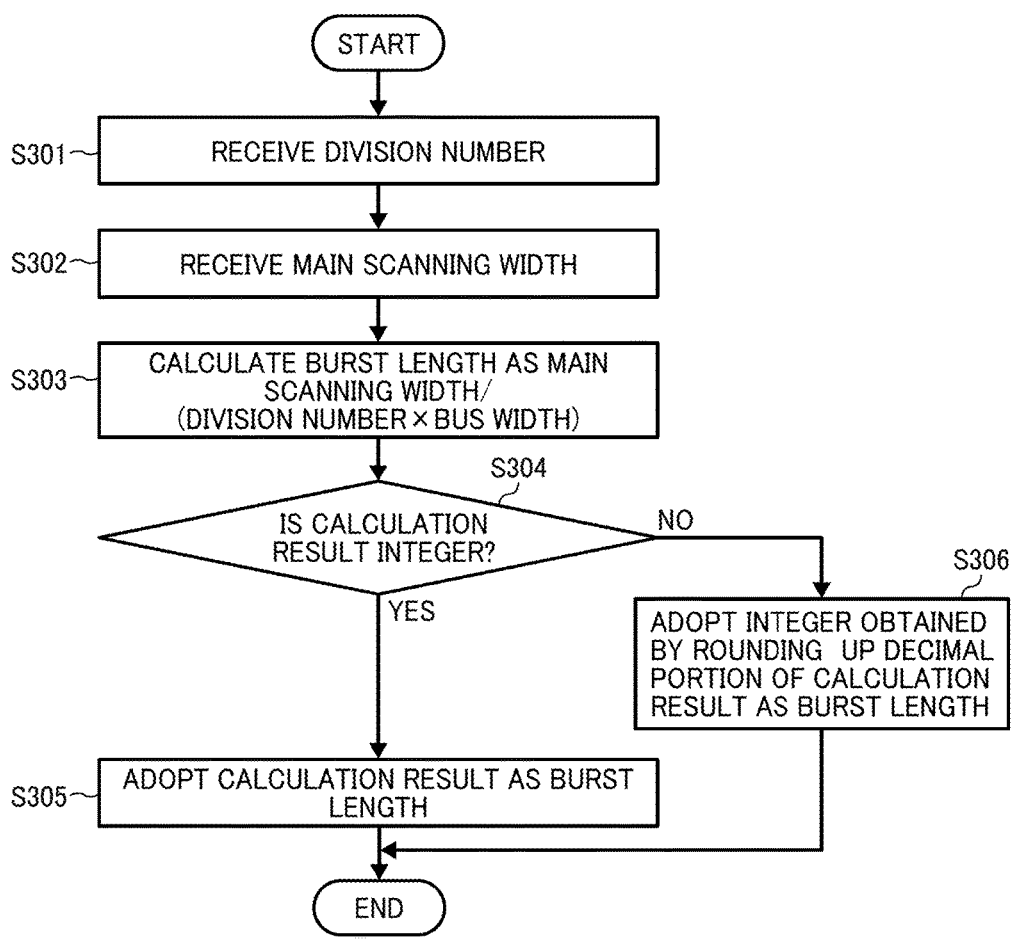
FIG. 17 is a flowchart illustrating a burst length calculation process.

The burst length calculator 416 performs the burst length calculation process at step S104 in FIG. 14, as illustrated in the flowchart of FIG. 17. Specifically, the burst length calculator 416 receives the division number form the division number controller 413 (step S301), and receives the main scanning width from the register 415 (step S302). Based on the main scanning width, the division number, and a bus width, the burst length calculator 416 calculates the burst length as main scanning width/(division number×bus width) (step S303). Herein, the bus width refers to a previously determined bus width used to read the image data from the image memory 501.

The burst length calculator 416 checks if the calculation result is an integer (step S304). If the calculation result is an integer (YES at step S304), the burst length calculator 416 adopts the calculation result as the burst length (step S305), and the burst length calculation process is completed.

If the calculation result is not an integer at step 5304 (NO at step S304), the burst length calculator 416 rounds up any decimal portion of the calculation result into an integer and adopts the integer as the burst length (step S306), and the burst length calculation process is completed.

The foregoing description has focused on the inclined image data of the image of the document G read by the scanner 100. As described above, however, the description is similarly applicable to the image data input from the external apparatus GS, for example.

The inclination correction on the image data from the external apparatus GS is performed when the inclination is found in the input image data, or when the inclination is found not in the input image data but in the transfer sheet (i.e., output medium) onto which the image data is to be output. The inclination of the transfer sheet is caused by various factors, such as the mechanical precision of a sheet conveyance path and the temperature inside the multifunction peripheral 1.

If the inclination is found in the input image data, and if the inclination information of the inclination is transmitted to the multifunction peripheral 1 from the external apparatus GS together with the image data, the multifunction peripheral 1 addresses the inclination by performing a process similar to the above-described process of correcting the inclination of the image data read by the scanner 100.

If the inclination is found not in the input image data but in the transfer sheet, on the other hand, the multifunction peripheral 1 outputs the image data as inclined in accordance with the inclination of the transfer sheet, to thereby output the image on the transfer sheet such that the image is not inclined relative to the transfer sheet.

Specifically, to print out the image with the printer 200 based on the image data received from the external apparatus GS, for example, the multifunction peripheral 1 converts the image data into bitmap data and stores the converted image data in the image memory 501. The multifunction peripheral 1 then detects the inclination of the transfer sheet conveyed to the photoconductor 202 of the printer 200 with an inclination sensor disposed on the sheet conveyance path of the transfer sheet, and transmits the inclination information of the detected inclination to the image processing unit 408.

In this case, the image processing unit 408 reads from the image memory 501 the image data stored therein similarly as in the foregoing reading operation in accordance with the inclination information of the transfer sheet to cancel the inclination of the transfer sheet. If the transfer sheet is inclined downward to the right or left in this case, the image processing unit 408 reads the image data from the image memory 501 with an inclination for cancelling the inclination of the transfer sheet. With the image data thus read from the image memory 501 with the inclination, the image is printed out on the transfer sheet with the inclination of the image relative to the transfer sheet corrected.

When the transfer sheet (i.e., output medium) is inclined, therefore, the multifunction peripheral 1 outputs the image data as inclined in accordance with the inclination of the output medium while adjusting the read addresses at low cost, and thereby outputs the image in an appropriate direction at low cost.

As described above, in the multifunction peripheral 1 of the present embodiment, the image processing unit 408 includes the external memory I/F 409 (i.e., the data writing circuit), the internal memory 419 (i.e., the second memory), the coordinate generator 411 (i.e., the coordinate generating circuit), the maximum deviation amount calculator 412 (i.e., the maximum deviation amount calculating circuit), the division number controller 413 (i.e., the division number calculating circuit), the address generator 414 (i.e., the read address generating circuit), the burst length calculator 416 (i.e., the burst length calculating circuit), and the read DMAC 417 and the SRAM controller 418 (i.e., the data transferring circuit).

The external memory I/F 409 writes the image data to the image memory 501 (i.e., the first memory). The internal memory 419 has a line memory with a capacity of a plurality of lines to store the image data transferred from the image memory 501. The coordinate generator 411 generates the coordinate information based on the inclination information.

The coordinate information includes the coordinate in the main scanning direction and the coordinate in the sub-scanning direction that together represent the position of each of the pixels of the image data relative to the transfer sheet (i.e., the output medium) onto which the image data is to be output. The inclination information represents the inclination of the image data in the image memory 501 relative to the output medium. The maximum deviation amount calculator 412 calculates the maximum deviation amount in the sub-scanning direction of the image data from the coordinate information. The division number controller 413 calculates the division number for dividing the image data in the main scanning direction based on the number of the lines of the internal memory 419 and the maximum deviation amount in the sub-scanning direction of the image data. The address generator 414 generates the read start address for reading from the image memory 501 each of the divided areas of the image data divided by the division number. The burst length calculator 416 calculates the burst length based on the division number and the width of the image data in the main scanning direction. The read DMAC 417 and the SRAM controller 418 cooperate to read the divided areas of the image data from the image memory 501 and burst-transfer the divided areas of the image data to the internal memory 419 based on the read start address and the burst length.

Accordingly, the image processing unit 408 changes the division number of the image data in accordance with the inclination of the image data relative to the output medium, thereby optimizing the burst length in the burst transfer of the image data. Consequently, the image processing unit 408 corrects the inclined image data while transferring the image data with improved data transfer efficiency.

Further, in the image processing unit 408 of the multifunction peripheral 1 of the present embodiment, the coordinate generator 411 generates the coordinate information including the coordinate in the main scanning direction and the coordinate in the sub-scanning direction that together represent at least one of the position of each of the pixels of the image data relative to the image memory 501 based on the coordinates representing the inclination of the image data written to the image memory 501 relative to the image memory 501 and the position of each of the pixels of the image data relative to the output medium based on the coordinates representing the inclination of the image data written to the image memory 501 relative to the output medium.

The image processing unit 408 therefore changes the division number of the image data when the transfer sheet (i.e., the output medium) is inclined, as well as when the input image data is inclined, thereby optimizing the burst length in the burst transfer of the image data. Consequently, the image processing unit 408 corrects the inclined image data while transferring the image data with improved data transfer efficiency.

Further, in the image processing unit 408 of the multifunction peripheral 1 of the present embodiment, the division number controller 413 adopts the calculated division number if the calculated division number is a power of two.

Accordingly, address management of the internal memory 419 is simplified, optimizing the burst length in the burst transfer of the image data at low cost. Consequently, the image processing unit 408 corrects the inclined image data while transferring the image data with improved data transfer efficiency at low cost.

Further, in the multifunction peripheral 1 of the present embodiment, the image processing unit 408 further includes the dividing function setting key (i.e., the selecting circuit) that selects, as the division number, one of the division number calculated by the division number controller 413 and a predetermined fixed division number.

Accordingly, the image processing unit 408 selects whether to change or fix the burst length of the burst transfer as necessary. By changing or fixing the burst length of the burst transfer as necessary, therefore, the image processing unit 408 corrects the inclined image data while transferring the image data with further improved data transfer efficiency at an increased processing speed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image processing device comprising:
a data writing circuit configured to write image data to a first memory;
a second memory having a line memory with a capacity of a plurality of lines to store the image data transferred from the first memory;
a coordinate generating circuit configured to generate coordinate information based on inclination information, the coordinate information including a coordinate in a main scanning direction and a coordinate in a sub-scanning direction that together represent a position of each of pixels of the image data relative to an output medium onto which the image data is to be output, and the inclination information representing an inclination of the image data in the first memory relative to the output medium;
a maximum deviation amount calculating circuit configured to calculate a maximum deviation amount in the sub-scanning direction of the image data from the coordinate information;
a division number calculating circuit configured to calculate a division number for dividing the image data in the main scanning direction, based on the capacity of the second memory and the maximum deviation amount in the sub-scanning direction of the image data;
a read address generating circuit configured to generate a read start address for reading from the first memory each of divided areas of the image data divided by the division number;
a burst length calculating circuit configured to calculate a burst length based on the division number and a width of the image data in the main scanning direction;
a data transferring circuit configured to read the divided areas of the image data from the first memory and burst-transfer the divided areas of the image data to the second memory based on the read start address and the burst length; and
a controller circuit configured to,
read the image data from the second memory in such a manner that the inclination of the image data is corrected, and
output the corrected image data.

2. The image processing device of claim 1, wherein the coordinate generating circuit generates the coordinate information including the coordinate in the main scanning direction and the coordinate in the sub-scanning direction that together represent at least one of,
the position of each of pixels of the image data relative to the first memory based on coordinates representing an inclination of the image data written to the first memory relative to the first memory, and
the position of each of pixels of the image data relative to the output medium based on coordinates representing an inclination of the image data written to the first memory relative to the output medium.

3. The image processing device of claim 1, wherein the division number calculating circuit is configured such that the calculating of the division number includes,
generating a calculation result based on the capacity of the second memory and the maximum deviation amount in the sub-scanning direction of the image data, and
adopting the generated calculation result as the calculated division number in response to the generated calculation result being a power of two.

4. An image forming apparatus comprising:
an image reading device configured to read a document to generate first image data, the first image data being image data of the document;
the image processing device of claim 1 to perform image processing on the first image data; and
an image output device configured to form and output an image on an output medium based on the first image data upon which the image processing device performed the image processing.

5. An image processing method comprising:
writing image data to a first memory;
transferring the image data from the first memory to a second memory having a line memory with a capacity of a plurality of lines;
generating coordinate information based on inclination information, the coordinate information including a coordinate in a main scanning direction and a coordinate in a sub-scanning direction that together represent a position of each of pixels of the image data relative to an output medium onto which the image data is to be output, and the inclination information representing an inclination of the image data in the first memory relative to the output medium;
calculating a maximum deviation amount in the sub-scanning direction of the image data from the coordinate information;
calculating a division number for dividing the image data in the main scanning direction, based on the capacity of the second memory and the maximum deviation amount in the sub-scanning direction of the image data;
generating a read start address for reading from the first memory each of divided areas of the image data divided by the division number;
calculating a burst length based on the division number and a width of the image data in the main scanning direction;
reading the divided areas of the image data from the first memory and burst-transferring the divided areas of the image data to the second memory based on the read start address and the burst length;
reading the image data from the second memory in such a manner that the inclination of the image data is corrected; and
outputting the corrected image data.

6. The image processing method of claim 5, wherein the generating the coordinate information comprises:

generating the coordinate information including the coordinate in the main scanning direction and the coordinate in the sub-scanning direction that together represent at least one of,
    the position of each of pixels of the image data relative to the first memory based on coordinates representing an inclination of the image data written to the first memory relative to the first memory, and
    the position of each of pixels of the image data relative to the output medium based on coordinates representing an inclination of the image data written to the first memory relative to the output medium.

7. The image processing method of claim 5, wherein the calculating the division number comprises:
    generating a calculation result based on the capacity of the second memory and the maximum deviation amount in the sub-scanning direction of the image data, and
    adopting the generated calculation result as the calculated division number in response to the generated calculation result being a power of two.

8. A non-transitory recording medium storing a program for causing a computer to execute an image processing method, the image processing method comprising:
    writing image data to a first memory;
    transferring the image data from the first memory to a second memory having a line memory with a capacity of a plurality of lines;
    generating coordinate information based on inclination information, the coordinate information including a coordinate in a main scanning direction and a coordinate in a sub-scanning direction that together represent a position of each of pixels of the image data relative to an output medium onto which the image data is to be output, and the inclination information representing an inclination of the image data in the first memory relative to the output medium;
    calculating a maximum deviation amount in the sub-scanning direction of the image data from the coordinate information;
    calculating a division number for dividing the image data in the main scanning direction, based on the capacity of the second memory and the maximum deviation amount in the sub-scanning direction of the image data;
    generating a read start address for reading from the first memory each of divided areas of the image data divided by the division number;
    calculating a burst length based on the division number and a width of the image data in the main scanning direction;
    reading the divided areas of the image data from the first memory and burst-transferring the divided areas of the image data to the second memory based on the read start address and the burst length;
    reading the image data from the second memory in such a manner that the inclination of the image data is corrected; and
    outputting the corrected image data.

9. The non-transitory recording medium of claim 8, wherein the generating the coordinate information includes:
    generating the coordinate information including the coordinate in the main scanning direction and the coordinate in the sub-scanning direction that together represent at least one of
    the position of each of pixels of the image data relative to the first memory based on coordinates representing an inclination of the image data written to the first memory relative to the first memory, and
    the position of each of pixels of the image data relative to the output medium based on coordinates representing an inclination of the image data written to the first memory relative to the output medium.

10. The non-transitory recording medium of claim 8, wherein the calculating the division number comprises:
    generating a calculation result based on the capacity of the second memory and the maximum deviation amount in the sub-scanning direction of the image data, and
    adopting the generated calculation result as the calculated division number in response to the generated calculation result being a power of two.

\* \* \* \* \*